United States Patent
Outwater et al.

(12) 
(10) Patent No.: US 6,274,873 B1
(45) Date of Patent: Aug. 14, 2001

(54) SPECTRUM ANALYZER FOR READING AUTHENTICATION MARKS

(75) Inventors: Chris Outwater, Santa Barbara; Mark Helmick, Ventura, both of CA (US)

(73) Assignee: DNA Technologies Inc., Los Angeles, CA (US)

( * ) Notice: Subject to any disclaimer, the term of this patent is extended or adjusted under 35 U.S.C. 154(b) by 0 days.

(21) Appl. No.: 09/311,896

(22) Filed: May 14, 1999

Related U.S. Application Data

(60) Provisional application No. 60/108,956, filed on Nov. 18, 1998.

(51) Int. Cl.⁷ .................................................. G01N 21/64
(52) U.S. Cl. ................... 250/458.1; 250/271; 250/459.1
(58) Field of Search .............................. 250/458.1, 459.1, 250/472.1, 473.1, 483.1, 484.2, 271; 235/468, 469, 491; 283/92

(56) References Cited

U.S. PATENT DOCUMENTS

| | | |
|---|---|---|
| 3,858,977 * | 1/1975 | Baird et al. .............................. 356/71 |
| 3,922,090 * | 11/1975 | Fain ........................................ 356/71 |
| 4,165,002 | 8/1979 | Meagher . |
| 4,186,020 | 1/1980 | Wachtel . |
| 4,387,112 | 6/1983 | Blach . |
| 4,442,170 | 4/1984 | Kaule et al. . |
| 4,452,843 | 6/1984 | Kaule et al. . |
| 4,598,205 | 7/1986 | Kaule et al. . |
| 4,882,195 | 11/1989 | Butland . |
| 4,884,828 | 12/1989 | Burnham et al. . |
| 4,927,180 | 5/1990 | Trundle et al. . |
| 5,083,814 | 1/1992 | Guinta et al. . |
| 5,106,125 | 4/1992 | Antes . |
| 5,139,812 | 8/1992 | Lebacq . |
| 5,172,937 | 12/1992 | Sachetti . |
| 5,194,289 | 3/1993 | Butland . |
| 5,271,645 | 12/1993 | Wicker . |
| 5,331,140 | 7/1994 | Stephany . |
| 5,360,628 | 11/1994 | Butland . |
| 5,413,841 | 5/1995 | Mahn, Sr. et al. . |
| 5,502,304 | 3/1996 | Berson et al. . |
| 5,514,860 * | 5/1996 | Berson ................................. 235/468 |
| 5,525,380 | 6/1996 | Paz-Pujalt et al. . |
| 5,525,798 | 6/1996 | Berson et al. . |
| 5,542,971 | 8/1996 | Auslander et al. . |

(List continued on next page.)

FOREIGN PATENT DOCUMENTS

| | | | |
|---|---|---|---|
| 2938844 A1 * | 4/1981 | (DE) ................................ 250/339.02 |
| 0945821 A2 * | 9/1999 | (EP) ................................ G06K/9/00 |

OTHER PUBLICATIONS

International Search Report in PCT Application No. PCT/US00/13005 transmitted Jul. 21, 2000.

*Primary Examiner*—Constantine Hannaher
(74) *Attorney, Agent, or Firm*—Foley & Lardner

(57) ABSTRACT

A spectrum analyzer determines the light emission characteristics of an authentication mark that is invisible when illuminated with visible light but is visible when illuminated with IR light. The spectrum analyzer includes an IR light source, a mirror positioned to deflect light from the IR light source in a direction that is substantially perpendicular to a surface of the authentication mark, a first lens for collimating light that is emitted by the authentication mark in response to an illumination by the light from the IR light source, an optical element comprising a prism or a hologram for generating a spectrum from the collimated light, a second lens for imaging the spectrum, an IR light blocking filter, a detector positioned to receive light components of the spectrum after the spectrum has been imaged by the second lens and filtered by the IR light blocking filter, and a control unit connected to the detector and programmed to read the authentication mark based on intensities of the light components received by the detector.

26 Claims, 5 Drawing Sheets

U.S. PATENT DOCUMENTS

| | | |
|---|---|---|
| 5,569,317 | 10/1996 | Sarada et al. . |
| 5,583,489 | 12/1996 | Loemker et al. . |
| 5,599,578 | 2/1997 | Butland . |
| 5,611,958 | 3/1997 | Takeuchi et al. . |
| 5,667,317 | 9/1997 | Tan . |
| 5,674,698 | 10/1997 | Zarling et al. ...................... 435/7.92 |
| 5,698,397 | 12/1997 | Zarling et al. . |
| 5,766,324 | 6/1998 | Ikegaya et al. . |
| 5,867,586 * | 2/1999 | Liang ................................... 382/112 |
| 5,895,073 * | 4/1999 | Moore ................................... 283/70 |
| 5,978,118 * | 11/1999 | Flaherty ............................... 359/127 |
| 6,028,306 * | 2/2000 | Hayashi .............................. 250/235 |

* cited by examiner

SPECTRUM ANALYZER FOR READING AUTHENTICATION MARKS

REFERENCE TO PROVISIONAL APPLICATION

This application claims the benefit of U.S. Provisional Application No. 60/108,956, filed Nov. 18, 1998.

BACKGROUND OF THE INVENTION

1. Field of the Invention

The invention relates generally to authentication marks or security marks and, more particularly, a device and method for reading an authentication mark by analyzing the spectrum of visible light that is emitted by the authentication mark when the authentication mark is illuminated with infrared and/or ultraviolet light.

2. Description of the Related Art

Various techniques have been used to identify articles in an effort to reduce counterfeiting. For collectibles such as art works and sports memorabilia, where a single item may be worth millions of dollars, a technique that is highly refined and virtually impossible to copy is desired. This is because high potential counterfeiting gains will motivate counterfeiters to invest large sums of money and resources to defeat the anti-counterfeit measure. Similarly, the high cost of implementing an anti-counterfeit measure for collectibles is typically accepted by the owner or insurer, because the potential loss from counterfeiting is great.

On the other hand, for mass produced items such as apparel, CDs, and audio and video cassettes, cost is a more important factor in implementing an anti-counterfeit measure. The implementation cost must be small enough so that the cost of the protected product will not increase dramatically. Yet, the anti-counterfeit measure must be refined enough so that counterfeiters will be unable to defeat the anti-counterfeit measure in a sufficiently easy manner such that they will be able to economically produce and sell counterfeit goods.

Mass produced items also have to be protected against product diversion. Product diversion occurs when a counterfeiter acquires genuine, non-counterfeit goods that are targeted for one market and sells them in a different market. The counterfeiter does this to circumvent the manufacturer's goal of controlling the supply of his or her goods in a particular market and, as a consequence, benefits from the sales in that limited supply market or in the diverted sales market.

In one type of anti-counterfeit and anti-diversion measure, an ultraviolet (UV) ink is used to mark the product with an identifying indicia. One benefit of using the UV ink is that it is typically not visible when illuminated with light in the visible spectrum (380–770 nm), but is visible when illuminated with light in the UV spectrum (200–380 nm). Therefore, counterfeiters will be unable to tell whether the product contains a security mark by merely looking at the product when the product is illuminated with visible light.

A number of UV inks are readily available in the security industry and can be obtained at a relatively low cost. Several UV ink types and compositions are described, for example, in U.S. Pat. No. 5,569,317, entitled "Fluorescent and Phosphorescent Tagged Ink for Indicia" the disclosure of which is incorporated by reference herein. This patent discloses a security mark that becomes visible when illuminated with UV light having a wavelength of 254 nm.

However, the use of security marks containing a UV ink has seen increased use and counterfeiters have become knowledgeable about their use. It has been a common practice for counterfeiters to examine the UV ink from a product sample, reproduce or procure the same or similar UV ink that matches the characteristics of the UV ink from the product sample, and apply the same security mark on the counterfeit products using the substitute UV ink.

In another type of anti-counterfeit and anti-diversion measure, an infrared (IR) ink is used to mark the product with an identifying indicia. As with the UV ink, one benefit of using the IR ink is that it is typically not visible when illuminated with light in the visible spectrum, but is visible when illuminated with light in the IR spectrum (800–1600 nm). An additional benefit of using the IR ink is that it is more difficult to reproduce or procure the matching IR ink by studying a product sample containing the IR security mark. Examples of IR security mark usage are given in U.S. Pat. No. 5,611,958 and U.S. Pat. No. 5,766,324. The disclosures of these patents are incorporated by reference herein.

Combination security marks have also been proposed. In U.S. Pat. No. 5,360,628 and U.S. Pat. No. 5,599,578, the disclosures of both of which are incorporated by reference herein, a security mark comprising a visible component and an invisible component made up of a combination of a UV dye and a biologic marker, or a combination of an IR dye and a biologic marker is proposed. Also, in U.S. Pat. No. 5,698,397, the disclosure of which is incorporated by reference herein, a security mark containing two different types of up-converting phosphors is proposed.

The detection of invisible security marks is performed automatically using a photodiode, for example, or manually by observing the fluorescence that results from illumination with a UV or IR light source. Sometimes, an invisible security mark is printed as an invisible bar code, as in U.S. Pat. No. 5,502,304, U.S. Pat. No. 5,525,798, U.S. Pat. No. 5,542,971, and U.S. Pat. No. 5,766,324, and is read using a bar code reader. However, there has been no system for automatically determining the characteristics of light that is emitted from an invisible security mark as a result of illumination with a UV or an IR light source. For example, an IR ink may emit a green light in response to illumination with IR light, but the automatic reading systems described above merely look for any emission above a certain threshold and do not distinguish between a green light emission and any other spectral characteristic.

SUMMARY OF THE INVENTION

An object of this invention is to provide a system and method for determining the light emission characteristics of an authentication mark that is invisible when illuminated with visible light but is visible when illuminated with either UV or IR light. As used herein, an "invisible" mark is a mark that is not visible with the human eye when illuminated with light in the visible spectrum.

The above and other objects of the invention are achieved by a spectrum analyzer having an IR light source, a mirror positioned to deflect light from the IR light source in a direction that is substantially perpendicular to a surface of the authentication mark, a first lens for collimating light that is emitted by the authentication mark in response to an illumination by the light from the IR light source, an optical element comprising a prism or a hologram for generating a spectrum from the collimated light, a second lens for imaging the spectrum, an IR light blocking filter, a detector positioned to receive light components of the spectrum after the spectrum has been imaged by the second lens and filtered by the IR light blocking filter, and a control unit connected to the detector and programmed to read the authentication mark based on intensities of the light components received by the detector.

The detector comprises an array of photodiodes or charged-coupled devices (CCDs) each positioned to receive a different one of the imaged light components. Alternatively, a single aperture-photodiode assembly may be used. When the single aperture-photodiode assembly is used, the assembly can be controlled to be moved to a plurality of positions so that the photodiode receives a different one of the imaged light components through the aperture at each of the plurality of positions of the assembly or the optical element can be controlled to be rotated to a plurality of positions such that the photodiode receives a different one of the light component through the aperture at each of the plurality of positions of the optical element.

The spectrum analyzer according to the invention may further comprise a beam splitter positioned between the object lens and the prism, a reticle positioned to image light deflected by the beam splitter, and a movable stage on which the authentication mark is mounted. The movable stage can be controlled in accordance with the image formed by the reticle to align the authentication mark.

Additional objects, features and advantages of the invention will be set forth in the description of preferred embodiments which follows.

BRIEF DESCRIPTION OF THE DRAWINGS

The invention is described in detail herein with reference to the drawings in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
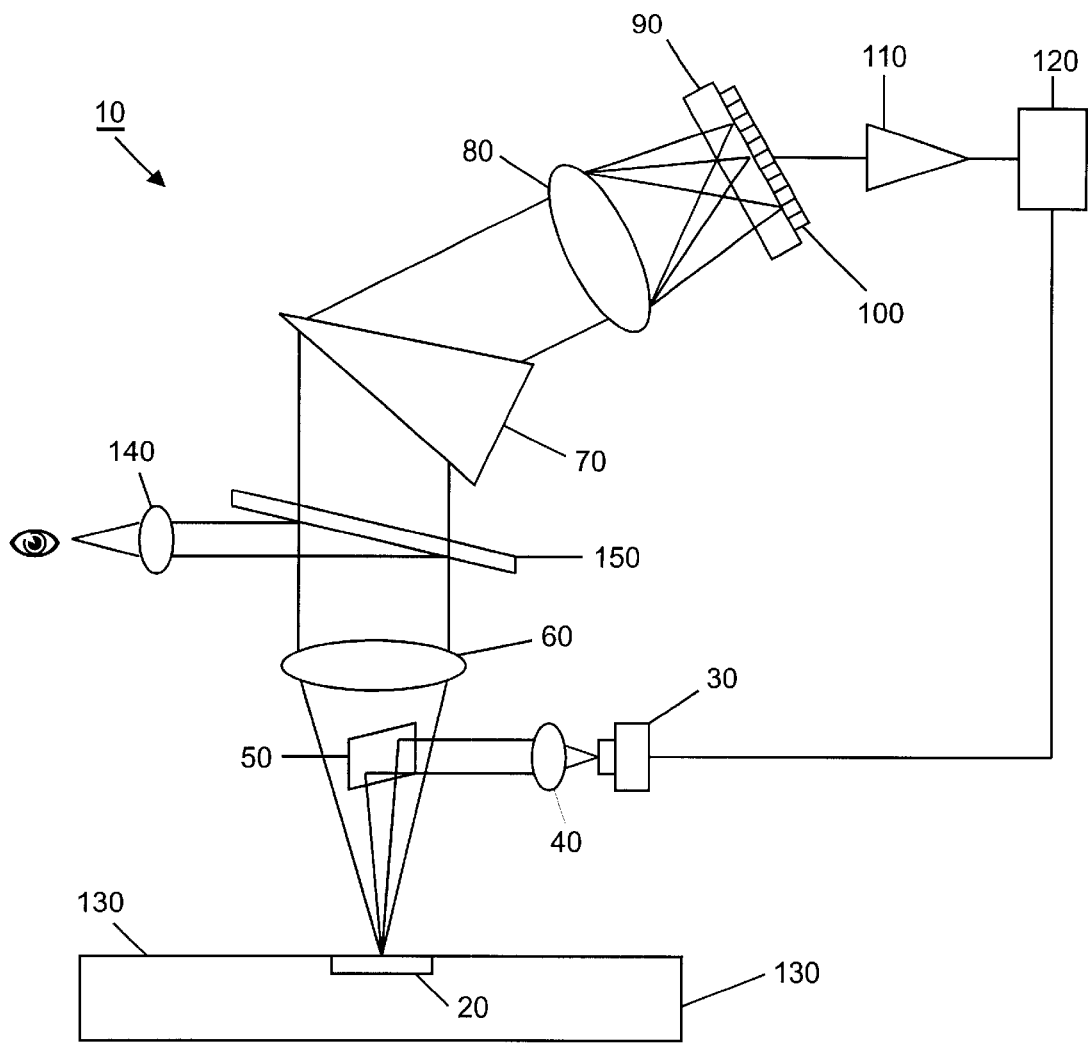
FIG. 1 illustrates a spectrum analyzer according to a first embodiment of the invention.

FIG. 1 illustrates a spectrum analyzer 10 according to a first preferred embodiment. The spectrum analyzer 10 illuminates an authentication mark 20 using an infrared (IR) light that is generated by a light source 30, passed through a focusing lens 40, and deflected by a mirror 50. The mirror 50 is positioned directly above the mark 20 and angled such that the IR light generated by the light source 30 is deflected towards the mark 20 at an angle generally normal to the authentication mark surface.

The mark 20 includes an IR ink containing an up-converting phosphor that responds to an IR light excitation by fluorescing, i.e., emitting light in the visible spectrum. The up-converting phosphor used in the preferred embodiments is an up-converting phosphor "PTIR545" which is available from Phosphor Technology Ltd. This phosphor fluoresces when it is excited by an IR light having a wavelength of about 960 nm. Other up-converting phosphors may be used in the invention so long as the light source 30 produces an IR light having the necessary wavelength to cause the up-converting phosphor to fluoresce. The light source 30 of the preferred embodiments is a semiconductor laser that is capable of generating an IR laser having a wavelength of about 960 nm.

The IR ink containing the PTIR545 phosphor is formed by mixing this up-converting phosphor with a binder resin, which may be any acrylic or urethane resin that is thermoplastic. For cost reasons, only small quantities of the up-converting phosphor are used to form the IR ink. Hence, a diffuse IR light source will be unable to cause significant fluorescence intensity to be easily detected. Rather, a concentrated IR laser source directed at the particular location of the IR mark is necessary. In the preferred embodiments, the light source 30 has a power output of 20 mW. The power output can be adjusted up or down based on the amount of up-converting phosphor that is used in the IR ink.

The emitted light is collimated by an objective lens 60, and dispersed into its spectral components by an optical element 70. The optical element 70 may be a prism, a holographic optical element (HOE), or any other optical element that is capable of separating light into its spectral components. The spectral components are imaged by an imaging lens 80 and the imaged spectral components are passed through an IR light blocking filter 90 onto a photodetector array 100, which produces electrical signals that are proportional to the intensities of the light falling thereon. These electrical signals are amplified by an amplifier 110 and supplied to the microprocessor control unit 120 for processing. Alternative to the photodetector array 100, a charged coupled device (CCD) array may be provided.

The spectral components of the emitted light represent the characteristic features of the up-converting phosphor used in the mark 20. The relative intensities of each of these spectral components are converted into electrical signals using the photodetector array 100, and the control unit 120 identifies the characteristic features of the emitted light based on these electrical signals. For example, if the mark 20 emits a green light in response to IR illumination, the green component of the emitted light will be imaged onto a corresponding portion of the photodetector array 100, e.g., middle section of the photodetector array 100, and the control unit 120 will identify the emitted light as being "green" upon receipt of an electrical signal from the middle section of the photodetector array 100.

Preferably, the photodetector array 100 comprises 64–128 photodiodes and an amplifier 110 is provided for each photodiodes. In FIG. 1, only one amplifier 110 is illustrate for simplicity. The outputs of the amplifiers are multiplexed into a plurality of corresponding channels and the multiplexed signal is supplied to the control unit 120 for processing.

The IR light blocking filter 90 is provided because the light in the return path contains a substantial amount of IR reflections from the illuminating IR light. Without the filter 90, the useful signals that are generated at the photodetector array 100 by the up-converted emitted light is too small relative to the noise signals that are generated at the photodetector array 100 by the reflections of the illuminating IR light. Also, the filter 90 is shown in FIG. 1 to be in intimate contact with the photodetector array 100. The invention may be practiced with the filter 90 positioned anywhere along the optical path of the emitted light, but the other positions are less desirable because IR light tends to leak around the filter 90 the further away it is positioned from the photodetector array 100. If too much ambient light is a problem, the light source 30 is modulated (e.g., by the control unit 120) to produce IR light at a predetermined frequency and the electrical signals corresponding to the intensities of the spectral components of the emitted light are demodulated at the control unit 120.

If the mark 20 is not in alignment with the illuminating IR light, a movable stage 130 is repositioned until the mark 20 comes into alignment with the illuminating IR light. The alignment is performed with the aid of an image formed at a reticle lens 140 based on light deflections from a beam splitter 150.

In the present invention, the mirror 50 is angled so that the optical axis of the deflected illumination beam is coaxial with the optical axis of the object lens 60. This coaxial arrangement is desired because it results in a greater depth of field and insensitivity to object texture and/or surface inconsistencies. For example, if the mark 20 is applied on a non-uniform surface (e.g., a fabric) and the illuminating beam axis is offset (i.e., not coaxial) with respect to the optical axis of the object lens, the illumination point of the mark 20 moves up and down depending on the microscopic surface contours of the surface to cause the image formed at the detector 100 to be shifted right and left.

Figure 2:
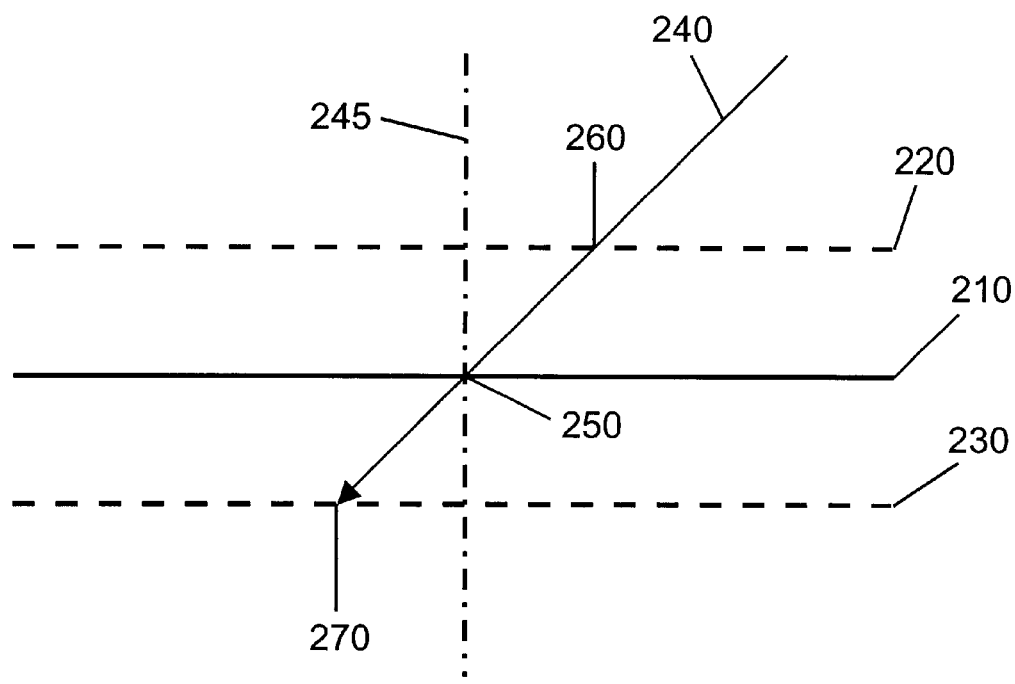
FIG. 2 is a diagram illustrating a shift in the imaged portion of the authentication mark based on the incidence angle of the illumination beam.

This point is illustrated in FIG. 2. In FIG. 2, line 210 represents the assumed surface of the mark 20 at one point. Lines 220 and 230 represent respectively a surface of the mark 20 at two other points. These surfaces are above and below the surface 210 because of surface inconsistencies. Line 240 represents an illumination beam that is offset with respect to a line 245 which represents the optical axis of the objective lens 60. When the mark 20 lies on the surface 210, a point 250 is imaged. However, when adjacent portions of the mark 20 lie above or below the surface 210, e.g., on the surface 220 or 230 respectively, as a result of texture changes or surface inconsistencies, a point 260 which is to the right of the point 250 is imaged or a point 270 which is to the left of the point 250 is imaged. Assuming the point 250 was the intended object, by virtue of having an illumination beam that is offset with respect to the optical axis of the objective lens 60, the image formed at the detector 100 is shifted right and left. On the other hand, if the illumination beam is coaxial with the optical axis 245 of the objective lens 60, the changes in the surface from 210 to 220 or 230 do not cause the image formed at the detector 100 to be shift right and left and may be more easily accommodated with the depth of field of the imaging system.

Figure 3:
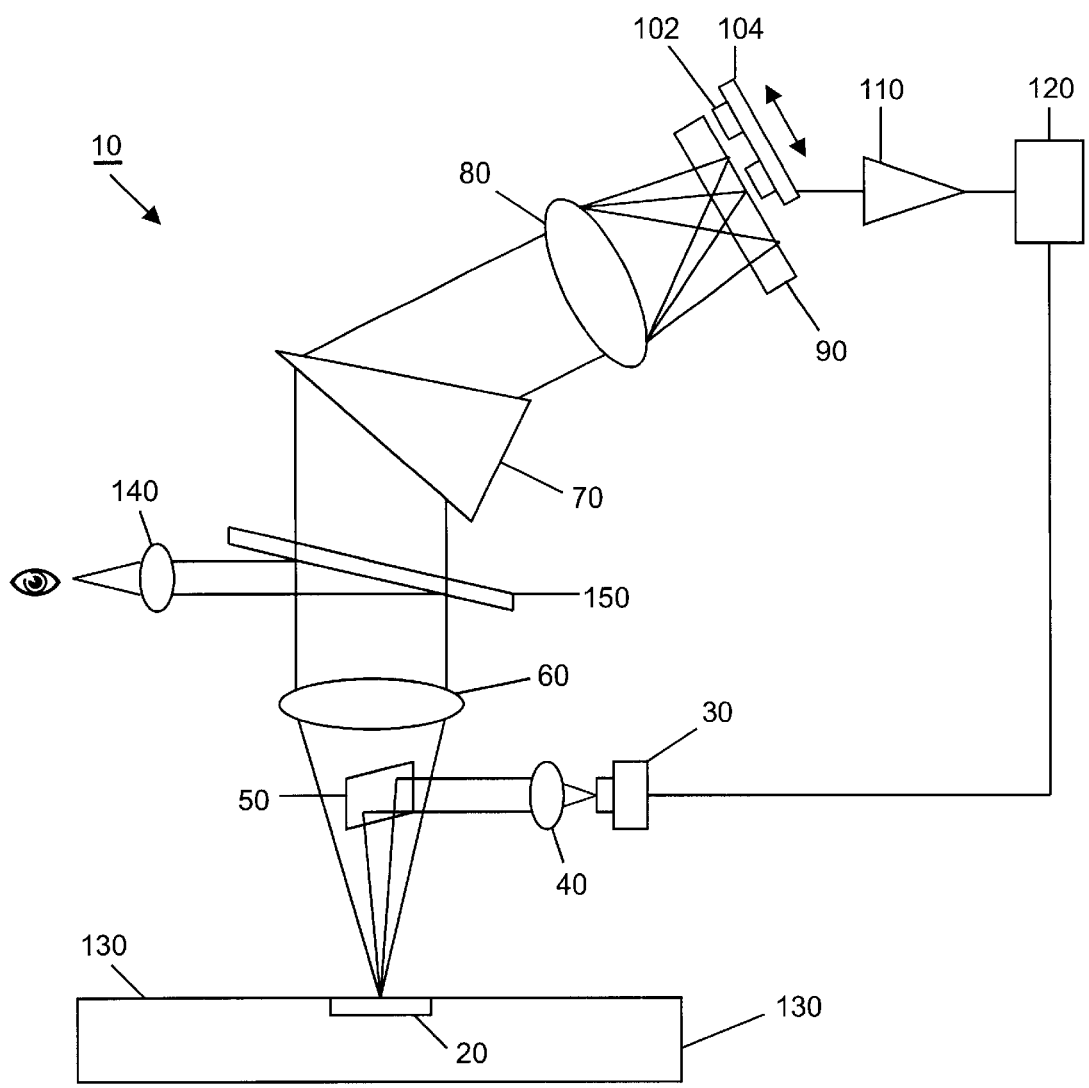
FIG. 3 illustrates a spectrum analyzer according to a second embodiment of the invention.

FIG. 3 illustrates a spectrum analyzer 10 according to a second preferred embodiment. The second embodiment is identical to the first embodiment except that a movable assembly including an aperture 102 and a photodetector 104 is provided instead of the photodetector array 100. The movable assembly is positioned by the control unit 120 for receipt of each spectral component imaged by the imaging lens 80 in a sequential manner. When all of the spectral components have been accounted for in this manner, the series of signals produced by the photodetector 104 are processed at the control unit 120 to identify the characteristic features of the emitted light based on these signals. Instead of moving the assembly 102/104, the prism 70 can be rotated about a fixed axis to cause different spectral components to be imaged at the photodetector 104 until all spectral components have been accounted for.

Figure 4:
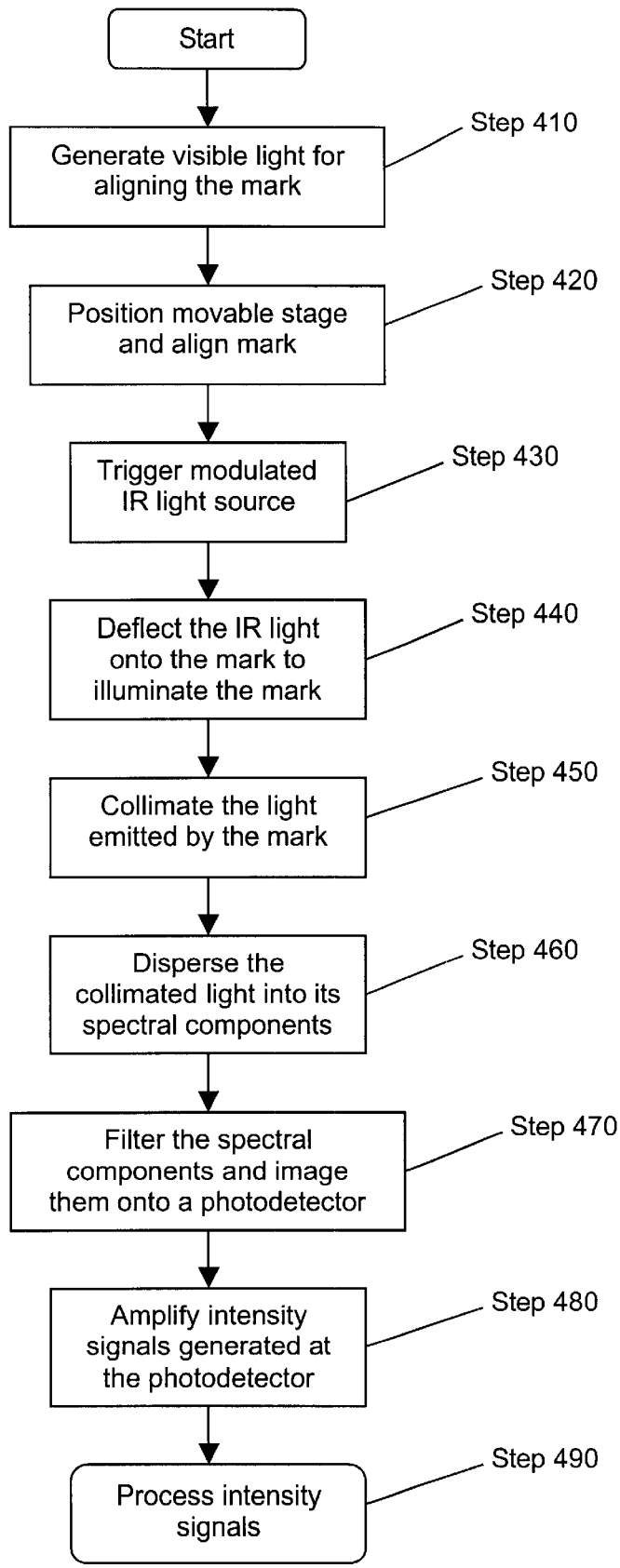
FIG. 4 illustrates the steps of reading the authentication mark according to the invention.

FIG. 4 illustrates the steps of reading the authentication mark according to the invention. The light source 30 is triggered in Step 410 to produce visible light for aligning the mark 20. In Step 420, the mark 20 is viewed through the reticle lens 140 and the movable stage 130 is positioned until the mark 20 comes into alignment with the visible light produced by the light source 30.

Once the mark 20 has been aligned, the light source 30 is triggered in Step 430 to produce modulated IR light for illuminating the mark 20. In Step 440, the IR light is deflected onto the mark 20. In Step 450, the light emitted by the up-converting phosphor contained in the mark 20 as a result of IR illumination is collimated and, in Step 460, the collimated light is dispersed into its spectral components. The spectral components are filtered and imaged onto the photodetector array 100 in Step 470, and the electrical signals produced by the photodetector array 100 are amplified in Step 480 and then processed in Step 495.

Figure 5:
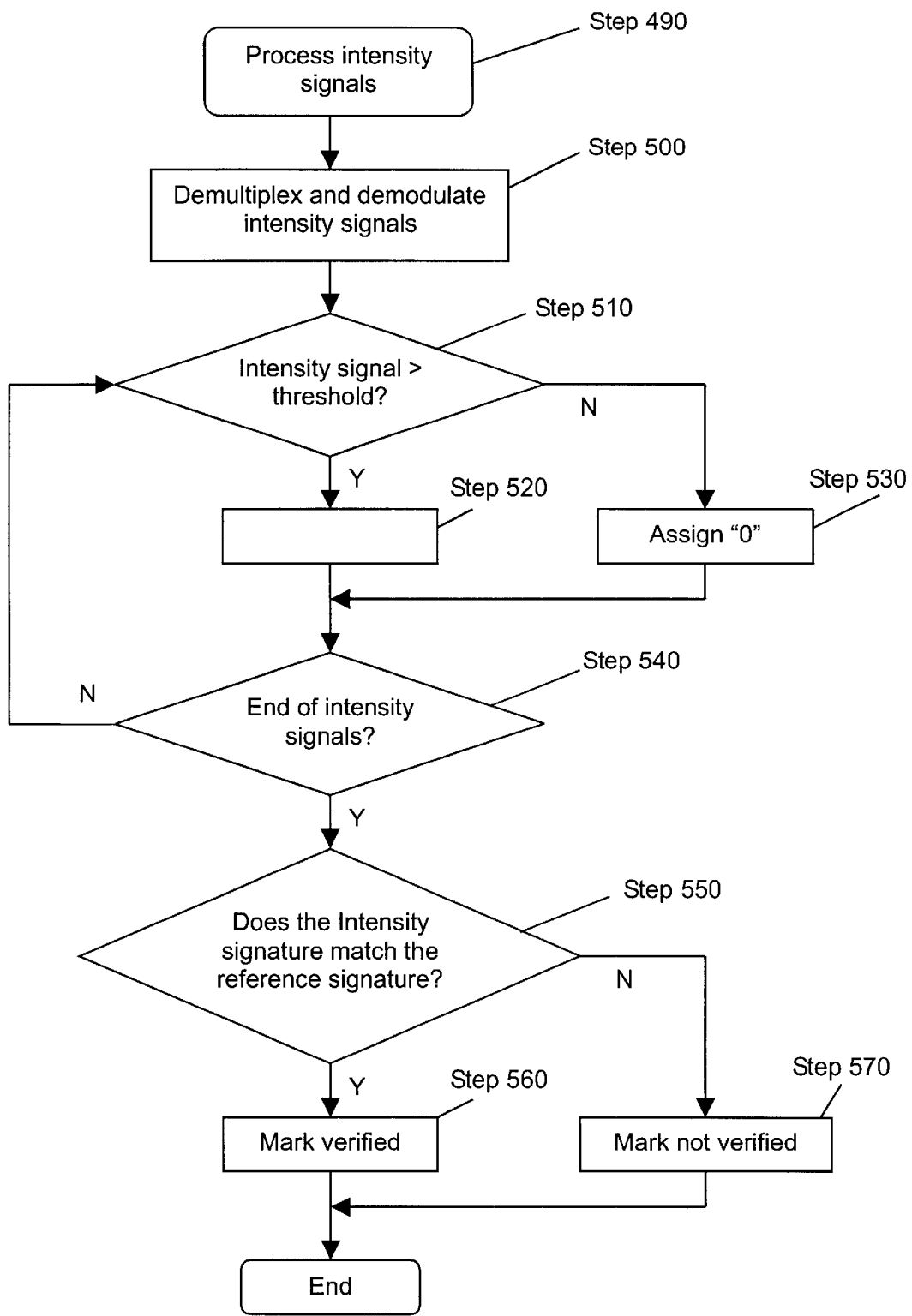
FIG. 5 is a flow diagram illustrating the steps for verifying the authentication mark according to the invention.

The flow diagram for processing the amplified electrical signals to verify the mark 20 is shown in FIG. 5. First, in Step 500, the multiplexed signal is demultiplexed and demodulated and the intensity signal in each of the channels is compared in Step 510 against a threshold. The threshold is set for each channel corresponding to each spectral component. If the signal exceeds the threshold, a "1" is assigned (Step 520). Otherwise, a "0" is assigned (Step 530). The series of 1's and 0's constitute an intensity signature of the spectral components of the emitted light. The program loops back to Step 510 until all channels have been processed in this manner (Step 540). Then, the completed intensity signature is compared in Step 550 with the series of 1's and 0's stored in memory corresponding to a reference intensity signature. The mark 20 is verified with a match (Step 550) but is not verified without a match (Step 560).

While particular embodiments according to the invention have been illustrated and described above, it will be clear that the invention can take a variety of forms and embodiments within the scope of the appended claims.

For example, instead of an IR light source and up-converting inks used in the authentication mark, UV light and down-converting inks may be used, or a combination of IR and UV inks with one or more light sources used simultaneously or sequentially.

Further, it is envisioned that an IR light source may be arranged directly along the optical axis of the system at the position of mirror 50 and thereby eliminating the need for the mirror 50. In this embodiment, an IR optical system generates the IR beam directly on to the surface of the authentication mark.

Also, the alignment of the IR light beam with respect to the mark 20 may be achieved by moving the spectral analyzer 10 with respect to the mark 20, instead of providing a movable stage 130 for moving the mark 20 with respect to the spectral analyzer 10.

Most importantly, the IR ink, when it fluoresces, may appear to the human eye to be a certain color when illuminated with IR light, but in fact contains a definite spectral signature which is known by the manufacturer of the authentication mark. Counterfeiters may attempt to reproduce the same overall color, but will find it very difficult to reproduce the exact same spectral signature which is determined by the exact selection of up-converting inks and their relative composition strengths.

We claim:

1. A device for reading an authentication mark having an IR mark that is visible when illuminated with IR light but not visible when illuminated with visible light, said device comprising:

an optical system for producing an IR beam oriented in a substantially perpendicular direction to a surface of the authentication mark;

a first lens for collimating light that is emitted by the authentication mark in response to an illumination by the light from the IR beam;

an optical element for generating a spectrum of physically separated light frequency components from the collimated light;

an IR light blocking filter;

a detector positioned to receive light frequency components of the spectrum after the spectrum has been filtered by the IR light blocking filter; and a control unit connected to the detector and programmed to read the authentication mark based on intensities of the light components received by the detector.

2. The device according to claim 1, wherein the optical system includes an IR light source for generating the IR beam and a mirror that deflects the IR beam in the substantially perpendicular direction to the surface of the authentication mark.

3. The device according to claim 1, further comprising a second lens for imaging the spectrum from the optical element, wherein the IR light blocking filter is positioned to filter the IR light from the light components imaged by the second lens.

4. The device according to claim 1, further comprising a second lens for imaging the spectrum from the optical element, wherein the IR light blocking filter is positioned to filter the spectrum from the optical element, and the second lens images the IR-filtered spectrum onto the detector.

5. The device according to claim 1, wherein the optical element comprises a hologram.

6. The device according to claim 1, wherein the optical element comprises a prism.

7. The device according to claim 6, wherein the detector comprises an array of photodiodes each photodiode positioned to receive a different portion of said physically separated light frequency components.

8. The device according to claim 6, wherein the detector comprises an array of CCDs each positioned to receive different portion of said physically separated light frequency components.

9. The device according to claim 6, wherein the detector comprises an aperture-photodiode assembly that is movable to a plurality of positions, the photodiode receiving different portions of the physically separated light components through the aperture at each of the plurality of positions of the assembly.

10. The device according to claim 6, wherein the detector comprises an aperture-photodiode assembly and the prism is rotatable about a fixed axis to a plurality of positions, the photodiode receiving different light components through the aperture at each of the plurality of positions of the prism.

11. The device according to claim 6, further comprising:

a beam splitter positioned between the collimating lens and the prism;

a reticle positioned to image light deflected by the beam splitter; and a movable stage on which the authentication mark is mounted, the movable stage being controlled in accordance with the image formed by the reticle.

12. A device for generating a plurality of visible light components from an authentication mark having an IR mark that is visible when illuminated with IR light but not visible when illuminated with visible light, said imaging device comprising:

an IR light source;

means for deflecting light from the IR light source in a direction that is substantially perpendicular to a surface of the authentication mark;

a first lens for collimating light that is emitted by the authentication mark in response to an illumination by the light from the IR light source;

means for generating a spectrum of physically separated light frequency components from the collimated light;

means for imaging the spectrum to have visible light components but no IR light components.

13. The device according to claim 12, wherein the means for imaging includes an IR light blocking filter and an imaging lens.

14. The device according to claim 13, wherein the IR light blocking filter is positioned to filter the IR light from the imaged light components after the light components have been imaged by the imaging lens.

15. The device according to claim 13, wherein the IR light blocking filter is positioned to filter the IR light from the spectrum and the imaging lens generates the visible light components from the IR-filtered spectrum.

16. The device according to claim 12, wherein the means for generating the spectrum comprises a hologram.

17. The device according to claim 12, wherein the means for generating the spectrum comprises a prism.

18. A method for reading an authentication mark having an IR mark that is visible when illuminated with IR light but not visible when illuminated with visible light, said method comprising the steps of:

exposing the IR mark with an IR light beam that is substantially perpendicular to a surface of the authentication mark;

collecting light that is emitted by the authentication mark;

generating a spectrum of physically separated light frequency components from the collected light; and determining features of the IR mark based on intensities of spectral components of the spectrum, wherein said IR light beam is IR filtered at some point before said step of determining.

19. The method according to claim 18, further comprising the steps of imaging the components of the spectrum onto a detector, producing signals proportional to the intensities of the components, and amplifying the signals before the step of determining.

20. The method according to claim 19, wherein the detector comprises an array of photodiodes and the step of producing signals includes the step of producing an intensity signal at each of the photodiodes.

21. The method according to claim 19, wherein the detector comprises a movable aperture-photodiode assembly and the step of producing signals includes the step of producing intensity signals as the assembly is moved to different positions.

22. The method according to claim 19, wherein the spectrum is generated using a rotatable prism and the detector comprises a aperture-photodiode assembly, and wherein the step of producing signals includes the step of producing intensity signals as the prism is rotated to different positions.

23. A method for verifying an authentication mark having an IR mark that is visible when illuminated with IR light but not visible when illuminated with visible light, said method comprising the steps of:

illuminating the IR mark with an IR light beam to cause the IR mark to emit visible light;

imaging spectral components of the emitted visible light, said spectral components being physically separated from one another;

detecting intensities of the spectral components to obtain an intensity signature of the emitted visible light; and comparing the intensity signature of the emitted visible light with a reference intensity signature to verify the authentication mark.

24. The method according to claim 23, further comprising the step of positioning the IR mark to be aligned with the IR light beam.

25. The method according to claim 24, further comprising the step of filtering IR light from the emitted visible light.

26. The method according to claim 23, wherein the step of illuminating includes the steps of generating the IR light beam and deflecting the IR light beam in a direction that is perpendicular to a surface of the IR mark.

* * * * *